US006623037B2

(12) United States Patent  
Ritters et al.

(10) Patent No.: US 6,623,037 B2  
(45) Date of Patent: Sep. 23, 2003

(54) SEAT BELT CONFIGURATION HAVING INDIVIDUAL BELT RETRACTORS FOR THE SHOULDER BELT AND THE LAP BELT

(75) Inventors: Ernst-Wilhelm Ritters, Braunschweig (DE); Carsten Möker, Rühen (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/970,440

(22) Filed: Oct. 3, 2001

(65) Prior Publication Data

US 2002/0067035 A1 Jun. 6, 2002

Related U.S. Application Data

(63) Continuation of application No. PCT/EP00/02268, filed on Mar. 15, 2000.

(30) Foreign Application Priority Data

Apr. 3, 1999 (DE) .......................... 199 15 275

(51) Int. Cl.$^7$ ............................... B60R 22/30
(52) U.S. Cl. ................. 280/801.1; 24/579.11
(58) Field of Search ................. 280/808, 801.1, 280/807; 297/468, 472, 483; 24/633, 579.11, 265 BC, 198, 200

(56) References Cited

U.S. PATENT DOCUMENTS

| | | | | |
|---|---|---|---|---|
| 2,846,745 A | * | 8/1958 | Lathrop | 297/468 |
| 3,542,426 A | * | 11/1970 | Radke | 24/633 |
| 3,583,764 A | | 6/1971 | Lohr et al. | |
| 3,600,768 A | * | 8/1971 | Romanzi et al. | 24/579.11 |
| 4,108,471 A | * | 8/1978 | Kondo et al. | 280/807 |
| 4,179,136 A | * | 12/1979 | Matsuoka | 280/808 |
| 4,420,172 A | * | 12/1983 | Kojima | 280/808 |
| 4,444,432 A | * | 4/1984 | Kikuchi | 280/808 |
| 4,518,173 A | * | 5/1985 | Yamada et al. | 280/808 |
| 4,915,413 A | | 4/1990 | Meyer | |
| 5,208,953 A | * | 5/1993 | McFalls | 24/579.11 |
| 5,403,038 A | * | 4/1995 | McFalls | 280/808 |
| 6,033,029 A | * | 3/2000 | Henshall | 297/468 |

FOREIGN PATENT DOCUMENTS

| | | | | |
|---|---|---|---|---|
| CA | 2209200 | | 2/1999 | |
| CH | 596013 | | 2/1978 | |
| FR | 2468382 | | 5/1981 | |
| JP | 5316219 A | * | 2/1978 | ......... B60R/21/10 |
| JP | 04143148 | | 5/1992 | |

\* cited by examiner

Primary Examiner—Paul N. Dickson  
Assistant Examiner—David R. Dunn  
(74) Attorney, Agent, or Firm—Laurence A. Greenberg; Werner H. Stemer; Manfred Beck

(57) ABSTRACT

A seat belt configuration includes a shoulder belt, a lap belt, a belt lock, and belt retractors. A release mechanism is assigned to the shoulder belt and/or the lap belt so that the first belt retractor can be separated from the second belt retractor. The release mechanism includes web-shaped or bolt-holding elements for securing respective belt ends of the shoulder belt and the lap belt or respective belt ends of two sections of the shoulder belt or of the lap belt. At least one of the holding elements has a retaining structure and is releasable when the retaining structure is inactivated.

9 Claims, 3 Drawing Sheets

SEAT BELT CONFIGURATION HAVING INDIVIDUAL BELT RETRACTORS FOR THE SHOULDER BELT AND THE LAP BELT

CROSS-REFERENCE TO RELATED APPLICATION

This application is a continuation of copending International Application No. PCT/EP00/02268, filed Mar. 15, 2000, which designated the United States.

BACKGROUND OF THE INVENTION

Field of the Invention

The invention relates to a seat belt configuration having individual belt retractors for the shoulder belt and the lap belt.

Seat belt configurations of this type are for example used for so-called integral seats in motor vehicles produced by American vehicle manufacturers. In the case of seats of this type, the belt retractor which is assigned to the shoulder belt may be fixed on a side of the seat backrest and the belt retractor which is assigned to the lap belt is fixed on the actual seat. U.S. Pat. Nos. 4,915,413 and 3,583,764 disclose seat belt configuration of this type.

Seat belt configurations having a common belt lock and individual belt retractors for the shoulder belt and the lap belt have advantages with respect to their operation and use due to the individual belt retractors. A disadvantage of such seat belt configurations is however, that the installation of the belt retractors turns out to be rather difficult in particular because of the fact that the common belt lock is assigned to both, the shoulder belt and the lap belt. The difficulties during the installation are primarily caused by the fact that the belts have to be passed through slots provided in trim parts.

SUMMARY OF THE INVENTION

It is accordingly an object of the invention to provide a seat belt configuration which overcomes the above-mentioned disadvantages of the heretofore-known seat belt configurations of this general type and which avoids installation difficulties or assembly difficulties without impairing the functioning of the seat belt configuration and without requiring additional space.

With the foregoing and other objects in view there is provided, in accordance with the invention, a seat belt configuration, including:
a shoulder belt;
a lap belt;
a belt lock provided jointly for the shoulder belt and the lap belt and configured to be connected to the shoulder belt and to the lap belt;
a first belt retractor assigned to the shoulder belt;
a second belt retractor assigned to the lap belt, the first belt retractor and the second belt retractor being connected via the shoulder belt and the lap belt;
a release mechanism, assigned to the shoulder belt and/or the lap belt, for deliberately separating the first belt retractor from the second belt retractor;
the release mechanism including holding elements for securing respective belt ends of the shoulder belt and the lap belt, respective belt ends of two sections of the shoulder belt or respective belt ends of two sections of the lap belt;
each of the holding elements being a web-shaped element or a bolt-shaped element; and
at least one of the holding elements having a retaining structure associated therewith, and the at least one of the holding elements being releasable when the retaining structure is inactivated.

In other words, a seat-belt configuration according to the invention includes a shoulder belt, a lap belt, a belt lock common to both belts, individual belt retractors for both belts, and a device assigned to at least one of the belts for the intentional separation of the connection between both belt retractors connected via the belts, wherein the device includes separate web-like or bolt-like elements which are disposed parallel to one another and are intended for securing in each case one belt end or in each case one end of two belt lengths produced by dividing one of the belts, and wherein at least one of these elements can be released after inactivating a retaining structure.

The object of the invention is thus achieved in an elegant and simple manner by the fact that the coupling between the two belt retractors via the belts is separated by a release mechanism assigned at least to one of the two belts. In particular, the passing of the belts through the slots assigned to them in trim parts is thus not impeded by the belt retractors, since the defined devices can be kept relatively flat, so that they can easily be passed through the slots.

The seat belt configuration according to the invention allows to reliably and safely secure a device for separating a connection or a release mechanism at loop-shaped ends of both belts or at loop-shaped ends of two belt lengths produced by dividing one of the belts.

It is noted that within the context of the invention use can also be made of a seat belt system whose belt retractor which is assigned to the shoulder belt is mounted on a pillar of the vehicle, for example on a B-pillar. It is further noted that a belt retractor within the context of the invention includes automatic belt-retracting and belt-tensioning devices.

According to another feature of the invention, the belt lock includes a belt-side component. The holding elements are provided at the belt-side component of the belt lock.

According to yet another feature of the invention, the holding element with the retaining structure is configured as a threaded bolt.

According to a further feature of the invention, the belt-side component of the belt lock is a plug-in tongue or latch plate.

According to yet a further feature of the invention, the holding elements are disposed one behind another on the plug-in tongue.

According to another feature of the invention, the seat belt configuration includes a coupling device for providing a separable connection between the ends of the two sections of the shoulder belt or the lap belt. The holding elements of the release mechanism are disposed at the coupling device.

According to yet another feature of the invention, the coupling device includes two coupling parts. These two coupling parts are separable from one another for providing the separable connection and each of the two coupling parts is connected to a respective one of the ends of the two sections of the shoulder belt or the lap belt.

According to another feature of the invention, the retaining structure is configured to be destroyed when being inactivated.

According to yet another feature of the invention, the retaining structure is a flange, a crimp, or a bead.

Other features which are considered as characteristic for the invention are set forth in the appended claims.

Although the invention is illustrated and described herein as embodied in a seat belt configuration having individual belt retractors for the shoulder belt and the lap belt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
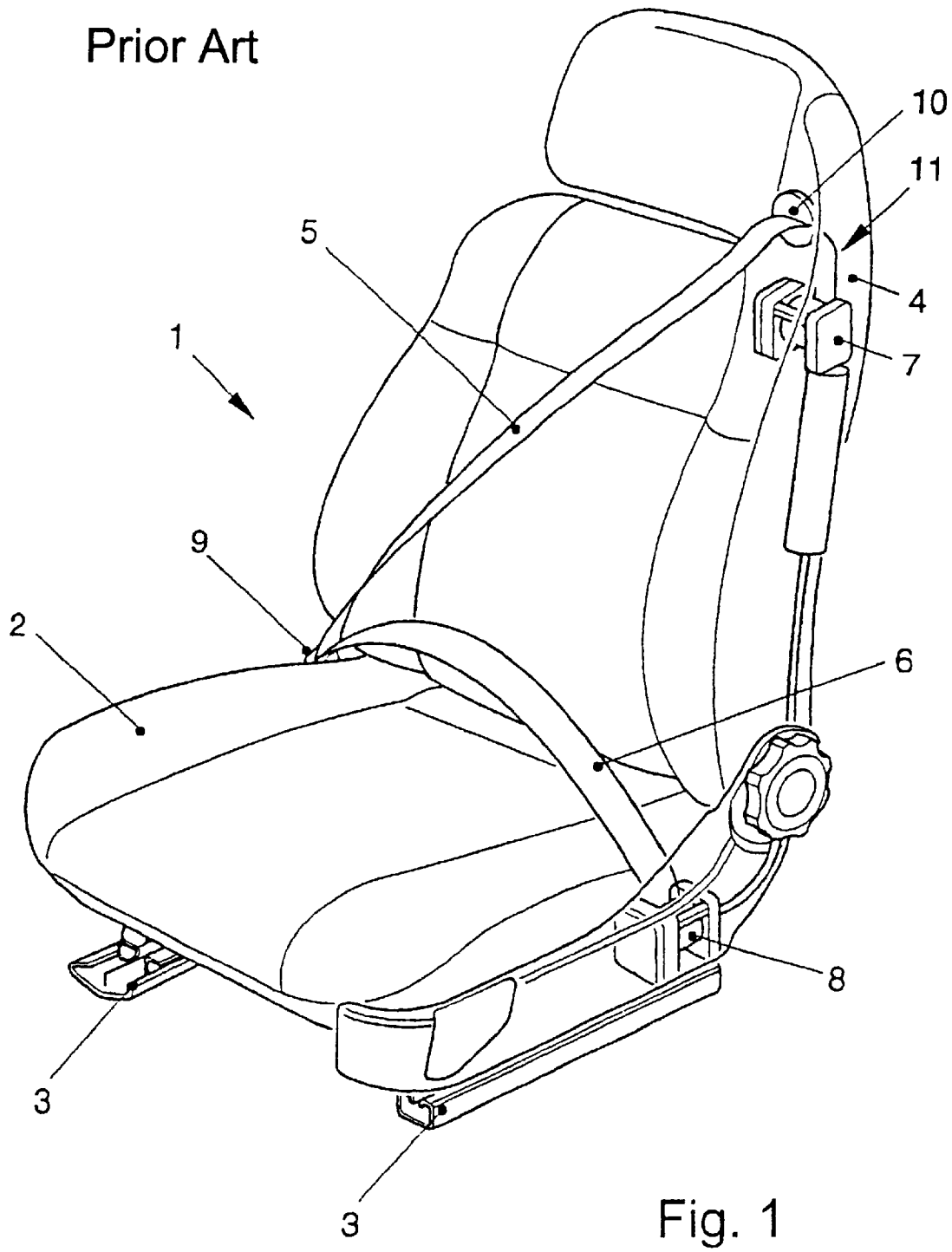
FIG. 1 is a diagrammatic, perspective view of an integral seat for illustrating the seat belt configuration according to the invention.

Referring now to the figures of the drawings in detail and first, particularly, to FIG. 1 thereof, there is shown a seat 1 with a squab region or seat region 2 which is provided with a device for longitudinally adjusting the seat 1 in rails 3 which are fixed on the floor of a vehicle. The seat 1 also has a backrest region 4 which can be adjusted in its inclination. The details of the construction of the seat are of no particular significance, whereas the construction of the seat belt configuration is of importance for the invention. The seat belt configuration includes the shoulder belt 5, the lap belt 6, the common belt lock 9 and belt retractors 7 and 8 which are individually assigned to the shoulder and lap belts. The belt retractors 7, 8 are respectively fastened on the side face of the backrest region 4 and on the seat region 2. The mutually facing ends of the two belts 5 and 6 are secured to the belt-side component of the belt lock 9, for example to a conventional plug-in tab or latch plate.

At least one of the belts 5, 6 is passed through a slot in a covering or trim part. FIG. 1 illustrates how the shoulder belt 5 is passed through a slot at a location 10 in a covering 11. This results in difficulties at least when installing the belt retractor 7, since the two belt retractors 7 and 8 are connected to one another via the belts 5 and 6 and via the belt-side component of the belt lock 9.

The invention eliminates these difficulties by providing devices which permit this connection between the two belt retractors to be eliminated. A release mechanism is provided for separating the first belt retractor 7 from the second belt retractor 8. The release mechanism includes holding elements 22, 23 or 30, 31 for securing respective belt ends of the shoulder belt 5 and of the lap belt 6 or, alternatively, respective ends of two belt sections of the shoulder belt 5 or of the lap belt 6. The two belt sections are formed by subdividing the shoulder belt or the lap belt. Each holding element may be a web-shaped element 22 or a bolt-shaped element 23, 30, 31. At least one of the holding elements 23, 30, 31 has a retaining structure, such as a thread, a crimp, a flange or a bead, associated therewith and is releasable when the retaining structure is inactivated.

Figure 2:
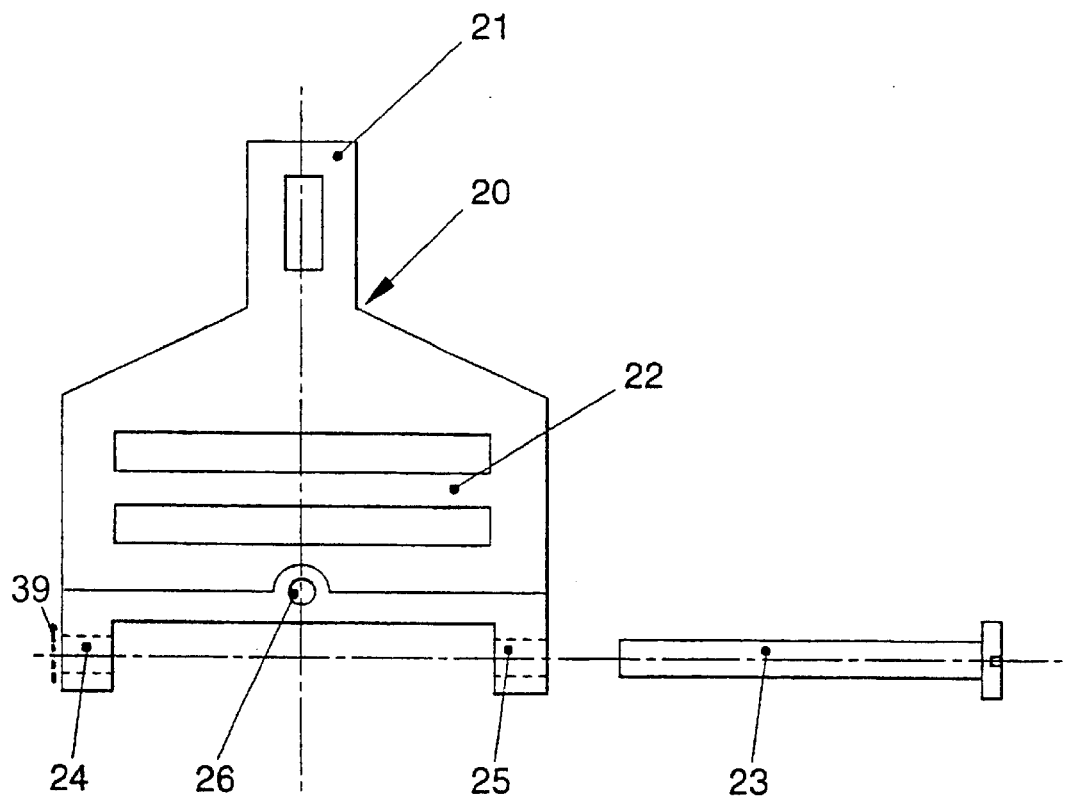
FIG. 2 is a diagrammatic plan view of a plug-in tab according to the invention.

The exemplary embodiment according to FIG. 2 illustrates a plug-in tab or latch plate 20 which forms the belt-side component of the common belt lock 9 shown in FIG. 1. In addition to the profiled region 21, which can be inserted into a corresponding socket or buckle that is fixed on the vehicle or the seat, i.e. in addition to the actual, active lock region of the plug-in tab 20, a holding element 22 for fastening one of the two belts denoted by 5 and 6 in FIG. 1 is provided. Further, a threaded bolt 23 which can be screwed firmly into the thread 24 of the actual plug-in tab 20 is provided. The threaded bolt 23 is used for fastening the end of the respective other one of the two belts 5 and 6. In FIG. 2, the threaded bolt 23 is shown outside of the actual plug-in tab 20, i.e. in a position in which it is pulled out of the loop-shaped end region of the belt assigned to it. As a result, the coupling or connection between the two belt retractors 7 and 8, which hinders the installation, is also broken up by separating the two belts 5, 6. In order to produce this connection or coupling, the loop-shaped end of the associated belt is held in the fork-like recess of the lower end of the plug-in tab 20. The bolt 23 is passed from right to left through the through hole 25 and through the loop-shaped belt end and the threaded portion of the bolt 23 is screwed into the threaded hole 24 on the plug-in tab 20. Of course, additional securing measures for holding the bolt 23 in this operating position may be provided. In addition to or instead of the retaining mechanism provided by the threading, a retaining or securing mechanism may be provided by performing a destructible flanging, crimping or beading, which is only schematically indicated by a dashed line 39.

The plug-in tab 20 is subdivided and a pivoting connection is provided at a location 26, the pivoting connection connecting parts of the plug-in tab 20.

Figure 3:
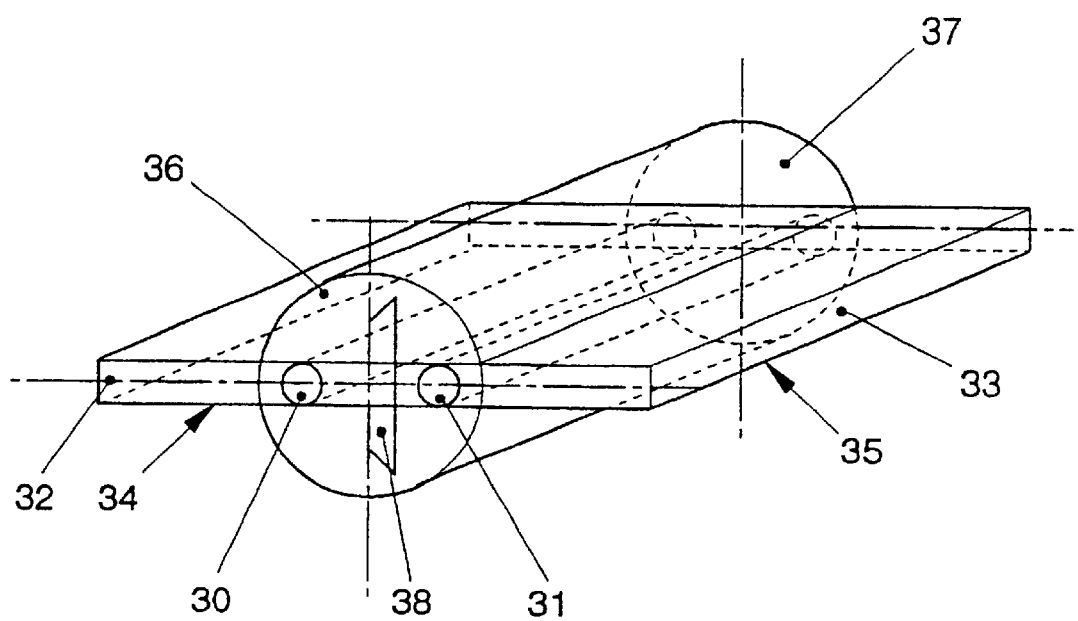
FIG. 3 is a diagrammatic perspective view of a device according to the invention for separating a connection between two belt retractors.

In the exemplary embodiment according to FIG. 1, the device according to the invention for separating the connection between the two belt retractors 7 and 8 is, as it were, integrated in the plug-in tab 20 and therefore in the belt-side component of the belt lock 9. An alternative embodiment of the device according to the invention is illustrated in FIG. 3, which shows, in a perspective view, a device which is configured as a separable coupling between two belt lengths which are obtained by subdividing one of the two belts 5 and 6. These belt lengths are in turn assigned releasable holding elements or bolts 30 and 31 which, after this coupling has been fitted to the ends of the belt lengths, in turn pass through loop-shaped end regions and lie in a plane having through slots 32 and 33 for the belt lengths. The corresponding slot housings 34 and 35 are connected rigidly to receptacles or sockets 36 and 37 for the two parts 30 and 31. In this exemplary embodiment, these two sockets 36 and 37 are in a fixed, mechanical connection via a dovetail connection 38. A relative displacement of the two sockets 36 and 37 can be performed to separate the sockets 36 and 37 from one another for facilitating the securing of the ends of the belt lengths. The relative displacement of the two sockets 36 and 37 is made possible for example, by overcoming a spring force or by removing a mechanical retaining or locking device for example a screw retaining device.

Accordingly, the invention eliminates in a simple manner the installation difficulties described above which arise in the case of a seat belt configuration having separate belt retractors for individual belts.

We claim:

1. A seat belt configuration, comprising:

a shoulder belt;

a lap belt;

a belt lock provided jointly for said shoulder belt and said lap belt and configured to be connected to said shoulder belt and to said lap belt;

a first belt retractor assigned to said shoulder belt;

a second belt retractor assigned to said lap belt, said first belt retractor and said second belt retractor being connected via said shoulder belt and said lap belt;

a release mechanism, assigned to at least one of said shoulder belt and said lap belt, for deliberately separating said first belt retractor from said second belt retractor;

said release mechanism including holding elements for securing respective belt ends selected from the group consisting of respective ends of said shoulder belt and said lap belt and respective ends of two sections of one of said shoulder belt and said lap belt;

each of said holding elements being selected from the group consisting of a web-shaped element and a bolt-shaped element; and at least one of said holding elements securing a given one of said belt ends and having a retaining structure associated therewith, said at least one of said holding elements being releasable when said retaining structure is inactivated, such that said given one of said belt ends is separated from said at least one of said holding elements.

2. The configuration according to claim 1, wherein:

said belt lock includes a belt-side component; and said holding elements are provided at said belt-side component of said belt lock.

3. The configuration according to claim 1, wherein said at least one of said holding elements with said retaining structure is a threaded bolt.

4. The configuration according to claim 2, wherein said belt-side component of said belt lock is a plug-in tongue.

5. The configuration according to claim 4, wherein said holding elements are disposed one behind another on said plug-in tongue.

6. The configuration according to claim 1, including:

a coupling device for providing a separable connection between said ends of said two sections of said one of said shoulder belt and said lap belt; and said holding elements of said release mechanism being disposed at said coupling device.

7. The configuration according to claim 6, wherein:

said coupling device includes two coupling parts; and said two coupling parts are separable from one another for providing the separable connection and each of said two coupling parts is connected to a respective one of said ends of said two sections of said one of said shoulder belt and said lap belt.

8. The configuration according to claim 1, wherein said retaining structure is configured to be destroyed when being inactivated.

9. The configuration according to claim 8, wherein said retaining structure is a structure selected from the group consisting of a flange, a crimp, and a bead.

* * * * *